United States Patent
Dillon et al.

(10) Patent No.: US 6,818,695 B2
(45) Date of Patent: Nov. 16, 2004

(54) EXTRUDABLE THERMOPLASTIC COMPOSITIONS

(75) Inventors: Maria P. Dillon, St. Paul, MN (US); John H. Horns, Edina, MN (US); Claude Lavallée, London (CA)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 10/151,788

(22) Filed: May 20, 2002

(65) Prior Publication Data

US 2003/0220450 A1 Nov. 27, 2003

(51) Int. Cl.[7] .......................... C08L 27/12; C08L 67/00; C08L 77/00
(52) U.S. Cl. .............................. 524/505; 424/DIG. 16; 524/513; 524/514; 524/519; 525/92 A; 525/165; 525/166; 525/178; 525/179; 525/185; 525/199
(58) Field of Search .............................. 525/92 A, 166, 525/165, 179, 178, 185, 199; 424/DIG. 16; 524/505, 513, 514, 519

(56) References Cited

U.S. PATENT DOCUMENTS

| | | |
|---|---|---|
| 2,968,649 A | 1/1961 | Pailthorp et al. |
| 3,051,677 A | 8/1962 | Rexford |
| 3,125,547 A | 3/1964 | Blatz |
| 3,318,854 A | 5/1967 | Honn et al. |
| 4,581,406 A | 4/1986 | Hedberg et al. |
| 4,829,116 A | 5/1989 | Piesold |
| 4,855,360 A | 8/1989 | Duchesne et al. |
| 5,707,569 A | 1/1998 | Priester et al. |
| 6,277,919 B1 | 8/2001 | Dillon et al. |

FOREIGN PATENT DOCUMENTS

| | | |
|---|---|---|
| EP | 0 447 535 B1 | 9/1991 |
| WO | WO 92/08749 | 5/1992 |
| WO | WO 95/21887 | 8/1995 |
| WO | WO 96/12754 | 5/1996 |
| WO | WO 97/19987 | 6/1997 |
| WO | WO 02/20668 A2 | 3/2002 |

OTHER PUBLICATIONS

Bruens, C., Nieland, R., Stanssens, D., "New Performance Additives From DSM", *Addcon World*, Oct. 19–27, 1999, Paper 9, pp. 1–6.

De Smedt, C., Nam, S., "The Processing Benefits of Fluoroelastomer Application in LLDPE", *Plastics and Rubber Processing and Applications*, vol. 8, No. 1, (1987), pp. 11–16.

Hong, V., Coombs, S.J., et al, *Polymer*, vol. 41, (2000), pp 7705–7713.

Johnson, B.V., Blong, T.J., Kunde, J. M., Duchesne, D., TAPPI 88, "Factors Affecting the Interaction of Polyolefin Additives with Fluorocarbon Elastomer Polymer Processing Aids", *Polymers, Laminations and Coating Conference*, pp. 249–256 (1988).

Johnson, B.V., Kunde, J.M., SPE ANTEC Tech. Papers, "The Influence of Polyolefin Additives on the Performance of Fluorocarbon elastomer Process Aids", 46, 1425 (1988).

Matthews, O.A., Shipway, A.N., Stoddart, J.F., "Dendrimers–Branching Out From Curiosities Into New Technologies" *Prog. Polymer Science*, vol. 23, 1988, pp. 1–56.

Rudin, A., Worm, A.T., Blacklock, J.E., "Fluorocarbon Elastomer Aids Polyolefin Extrusion", *Plastics Engineering*, Mar. 1986, pp. 63–66.

Westover, R.F., "Melt Extrusion", *Encyclopedia of Polymer Science and Technology*, vol. 8, John Wiley & Sons (1968), pp. 573–581.

*Primary Examiner*—Ana Woodward
(74) *Attorney, Agent, or Firm*—Brian E. Szymanski

(57) ABSTRACT

An extrudable composition comprising a major amount of a thermoplastic host polymer, a fluorocarbon polymer and a dendritic material wherein the extrudate demonstrates reduced levels of surface defects.

7 Claims, 2 Drawing Sheets

Capillary Rheometry Data. D4 and PPA1 at 1000 PPM. D4/PPA1 Combination at 1000 PPM, 2:1 Dendritic Materials:Fluropolymer.

Figure 1. Capillary Rheometry Data. D4 and PPA1 at 1000 PPM. D4/PPA1 Combination at 1000 PPM, 2:1 Dendritic Materials:Fluropolymer.
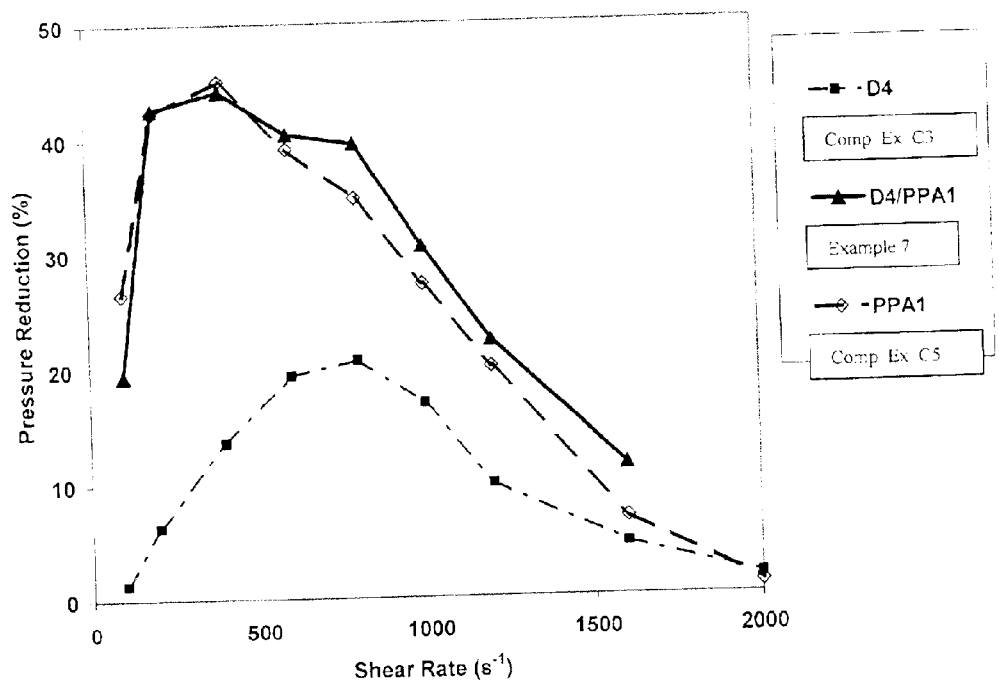

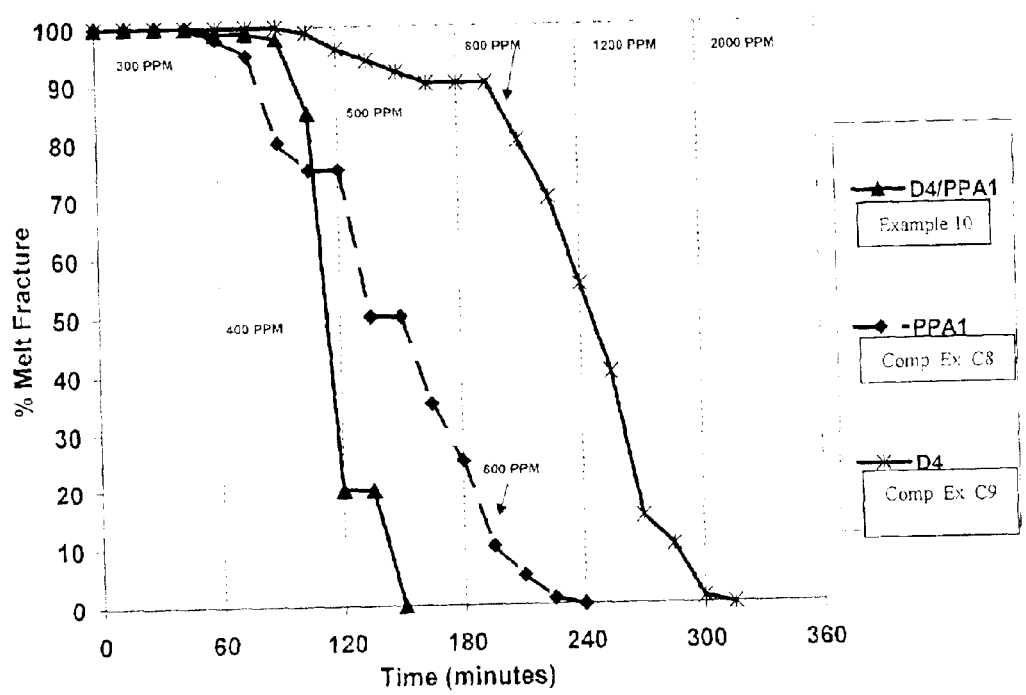
Figure 2. Determination of Additive Level Required to Eliminate Melt Fracture in MDPE R3.

EXTRUDABLE THERMOPLASTIC COMPOSITIONS

FIELD OF THE INVENTION

This invention relates to thermoplastic polymers, such as polyolefins or other difficult to extrude polymers, having improved extrusion characteristics. In another aspect it relates to the use of a dendritic material to improve the extrusion characteristics of such thermoplastic polymers, particularly in combination with other process additives. In a still further aspect it relates to the use of a dendritic material in a thermoplastic polymer further comprising an antiblock agent.

BACKGROUND OF THE INVENTION

Westover, R. F., "Melt Extrusion", *Encyclopedia of Polymer Science and Technology*, Vol. 8, John Wiley & Sons, (1968) pp 573–581 states that for any polymer there is a certain critical shear rate above which the surface of the extrudate becomes rough and below which the extrudate will be smooth. He further states that in order to achieve the highest possible flow rate from the extruder and to achieve the most uniform extrudate cross section the processor must control extrudate roughness or distortion. Some of the various types of extrudate roughness and distortion observed in high and low density polyethylene are described in Rudin, A., Worm, A. T., Blacklock, J. E., "Fluorocarbon Elastomer Aids Polyolefin Extrusion," *Plastics Engineering*, March 1986, pp. 63–66. Rudin et al. state that for a given set of processing conditions and die geometry, a critical shear stress exists above which polyolefins like linear low-density polyethylene (LLDPE), high-density polyethylene (HDPE), and polypropylene suffer from melt defects. At low shear rates, defects may take the form of "sharkskin", a loss of surface gloss, which in more serious manifestations, appears as ridges running more or less transverse to the extrusion direction. At higher shear rate the extrudate can undergo "continuous melt fracture" becoming grossly distorted. At rates lower than those at which continuous melt fracture is first observed, LLDPE and HDPE can also suffer from "cyclic melt fracture", in which the extrudate surface varies from smooth to rough. The authors state that lowering the shear stress by adjusting the processing conditions or changing the die can avoid these defects to a certain extent, but not without creating additional problems. For example, extrusion at a higher temperature can result in weaker bubble walls in tubular film extrusion, and a wider die gap can affect film orientation. The authors state that the use of fluorocarbons elastomer processing aids can permit the operation of extruders with narrower die gaps and lower melt temperatures. Others have also described the use of fluorocarbons elastomers as processing aids, see for example, De Smedt, C., Nam, S., "The Processing Benefits of Fluoroelastomer Application in LLDPE," *Plastics and Rubber Processing and Applications*, 8, No. 1, (1987), pp. 11–16; U.S. Pat. Nos. 3,125,547 (Blatz), 4,581,406 (Hedberg et al), and 4,855,360 (Ducchesne and Johnson).

The use of highly branched macromolecules as an additive in a thermoplastic composition has been described. These macromolecules are often referred to as dendrimers, dendritic polymers, arborescent polymers or hyperbranched polymers. For the purpose of this application, these materials will be referred to as dendritic materials. For example, PCT Patent No. WO 97/19987 discloses the use of a dendrimer comprising functional end groups into which an additive has been introduced. By proper selection of end groups, a dendrimer may be designed to carry an additive for delivery into a thermoplastic with a minimum of compatibility or bleeding problems. The use of a dendrimer to improve or eliminate sharkskin in LLDPE tubular film at low shear rates was reported by Hong, Y.; Coombs, S. J., et al., *Polymer*, 41(2000), 7705–7713.

Thermoplastic polymers used in extrusion processes typically contain a variety of additives in addition to processing aids, such as hindered amine light stabilizers, slip agents, fillers and antiblocking agents. A number of these commonly used additives have been shown to interfere with fluoropolymer processing additive performance. See WO 95/21887. The interference caused by antiblocks has been lessened with the addition of polyethylene glycol: B. V. Johnson, T. J. Blong, J. M. Kunde, D. Duchesne, TAPPI 88 Polymers, Laminations, and Coating Conference, 249–256 (1988) and B. V. Johnson, J. M. Kunde, SPE ANTEC Tech. Papers, 46, 1425, (1988).

A need still exists for additive systems which are designed to improve extrusion characteristics that function within a broader range of shear rates. A need also exists for alternate systems to improve extrusion characteristics of compositions comprising antiblock agents.

SUMMARY OF THE INVENTION

One aspect of the present invention provides an extrudable composition comprising
  (A) A major amount of a non-fluorinated thermoplastic host polymer, and a minor amount of a mixture of
  (B) fluorocarbon polymer, and
  (C) dendritic material.
Preferably, the dendritic material and the fluorocarbon polymer are present in such relative proportions and at concentrations which in combination or in concert, are sufficient to reduce extrusion pressure and/or melt defects, i.e. those defects, such as sharkskin, continuous melt fracture and cyclic melt fracture. A major amount in this case means 50 wt % or greater and a minor amount is less than 50 wt %.

Generally, the ratio of the weight of the fluorocarbon polymer to the dendritic material in the extrudable composition is 10 parts fluorocarbon polymer to at least I part dendritic material. Preferably, the weight ratio is in a range of 10:1 to 1:10. Where the extrudable composition is a final extrudate or final product, for example, a film, the concentration in the extrudable composition of the fluorocarbon polymer is at least 0.005 weight percent and that of the dendritic material is at least 0.0005 weight percent. This weight percent is based on the total weight of the extrudate. The preferred concentration ranges are 0.005 to 0.2 wt % fluoropolymer and 0.0005 to 2 wt % dendritic material.

In another aspect, this invention provides a polymer processing aid composition comprising fluorocarbon polymer and dendritic material such that the ratio of the weight of the fluorocarbon polymer to the dendritic material in the processing aid composition is less than 10:1. Preferably, the weight ratio is in a range of 10:1 to 1:10. Optionally, the processing aid composition further comprises other components or adjuvants, e.g. antioxidants, antiblocking agents, pigments and fillers, normally added to thermoplastic polymers. The concentration of the fluorocarbon polymer, dendritic material, and other adjuvants in said processing aid composition can vary depending upon the processor's requirements, but generally, the fluorocarbon polymer and dendritic material will be the major or predominant component of the processing aid composition. If the processing aid composition is provided in the form of a masterbatch, the carrier or host polymer of the masterbatch will be a large component of the processing aid composition.

In still another aspect, the advantage of the synergistic combination of fluoropolymer and dendritic material is shown in its best light when the host polymer of the extrudable composition comprises an additional component, such as an antiblock agent, that is known to lessen the beneficial effect of polymer process additives.

In a further aspect, this invention provides a method for reducing pressure encountered during the extrusion process, e.g., gate pressure, comprising:

a) providing a fluorocarbon polymer, b) providing a dendritic material, c) combining the fluorocarbon polymer and the dendritic material with a host polymer to form an extrudable composition, and d) extruding the composition, wherein the fluorocarbon polymer comprises at least 0.005 wt. % and the dendritic material comprises at least 0.0005 wt. % of the extrudable composition.

The pressure reduction realized by this process allows for higher throughput, for example by increasing the extruder screw speed to bring the pressure back to the starting value, a higher volume of material is extruded in a given amount of time. Alternatively, if the process is operated at the lower resulting pressure, less energy will be consumed. Both results are beneficial and some combination of the two may be desirable for specific applications.

In a still further aspect, this invention provides a method for reducing the presence of surface or melt defects encountered during the extrusion process, e.g., melt fracture, comprising:

a) providing a fluorocarbon polymer, b) providing a dendritic material, c) combining the fluorocarbon polymer and the dendritic material with a host polymer to form an extrudable composition, and d) extruding the composition, wherein the fluorocarbon polymer comprises at least 0.005 wt. % and the dendritic material comprises at least 0.0005 wt. % of the extrudable composition.

BRIEF DESCRIPTION OF THE DRAWINGS

FIG. 1 shows the change in pressure reduction at various shear rates for three extrudable compositions.

FIG. 2 shows the reduction in melt fracture at various additive levels for three extrudable compositions each containing an antiblock agent.

DETAILED DESCRIPTION

The present invention is effective in reducing melt defects by delaying the onset of melt defects in thermoplastic host polymers to higher extrusion shear rates than could be achieved using the same level of the fluorocarbon polymer alone. In addition, the invention permits the extruder to equilibrate and produce melt-defect-free extrudate in less time than would be required for an extrudate containing either the same level of fluorocarbon polymer alone or the same level of dendritic material alone at the same extrusion conditions. This polymer processing aid composition permits a more efficient use of fluorocarbon polymer as well as higher extruder throughputs and shorter extruder start up times when compared to processing aid compositions without the combination of fluoropolymer and dendritic material, e.g., fluoropolymer process aids alone or dendritic material process aids alone. This is particularly true when the extrudable composition also contains commonly added ingredients, such as antiblock agents, which can interfere with the performance of conventional process aids.

The thermoplastic polymers to which the fluorocarbon polymers and dendritic material are added comprise polymers obtained by the homopolymerization or copolymerization of olefins, as well as copolymers of one or more olefins and up to about 30 weight percent, but preferably 20 weight percent or less, of one or more monomers which are copolymerizable with such olefins, e.g. vinyl ester compounds such as vinyl acetate. Said olefins have the general structure $CH_2=CHR$, where R is a hydrogen or an alkyl radical, and generally, the alkyl radical contains not more than 10 carbon atoms and preferably one to four carbon atoms. Representative olefins are ethylene, propylene, and butene-1. Representative monomers which are copolymerizable with said olefins are vinyl ester monomers such as vinyl acetate, vinyl propionate, vinyl butyrate, vinyl chloroacetate, vinyl chloropropionate, acrylic and alpha-alkyl acrylic acid monomers, and their alkyl esters, amides, and nitriles such as acrylic acid, methacrylic acid, ethacrylic acid, methyl acrylate, ethyl acrylate, N,N-dimethyl acrylamide, methacrylamide, acrylonitrile, vinyl aryl monomers such as styrene, o-methoxystyrene, p-methoxy styrene, and vinyl naphthalene, vinyl and vinylidene halide monomers such as vinyl chloride, vinylidene chloride, vinylidene bromide, alkyl ester monomers of maleic and fumaric acid such as dimethyl maleate, diethyl maleate, vinyl alkyl ether monomers such as vinyl methyl ether, vinyl ethyl ether, vinyl isobutyl ether, 2-chloroethyl vinyl ether, and vinyl pyridine monomers, N-vinyl carbazole monomers, and N-vinyl pyrolidone monomers. The thermoplastic polymers also include the metallic salts of said olefin copolymers, or blends thereof, which contain free carboxylic acid groups. Illustrative of the metals which can be used to provide the salts of said carboxylic acid polymers are the one, two and three valence metals such as sodium, lithium, potassium, calcium, magnesium, aluminum, barium, zinc, zirconium, beryllium, iron, nickel and cobalt. The thermoplastic polymers also include blends of thermoplastic polymers with other thermoplastic polymers or copolymers or blends thereof containing conventional adjuvants such as antioxidants, light stabilizers, fillers, antiblocking agents and pigments. Representative examples of olefinic polymers useful in this invention are polyethylene, polypropylene, polybutene-1, poly(3-methylbutene), poly(4-methylpentene) and copolymers of ethylene with propylene, butene-1, hexane-1, octene-1, decene-1,4-methyl-1-pentene and octadecene-1.

Other thermoplastic host polymers useful in this invention include polyamides, polyesters, polyvinyl chloride, polycarbonates, polystyrene and other difficult to extrude thermoplastic polymers.

Representative blends of thermoplastic hydrocarbon polymers useful in this invention are blends of polyethylene and polypropylene, low-density polyethylene and high-density polyethylene, and polyethylene and olefin copolymers containing said copolymerizable monomers, some of which are described above, e.g., ethylene and acrylic acid copolymers; ethylene and methyl acrylate copolymers; ethylene and ethyl acrylate copolymers; ethylene and vinyl acetate copolymers; ethylene, acrylic acid, and ethyl acrylate copolymers, and ethylene, acrylic acid, and vinyl acetate copolymers.

The preferred thermoplastic hydrocarbon polymers are homopolymers of ethylene and propylene and copolymers of ethylene and 1-butene, 1-hexene, 1-octene, 4-methyl-1-pentene, propylene, vinyl acetate, and methyl acrylate.

The thermoplastic host polymers may be used in the form of powders, pellets, granules, or any other extrudable form.

Conventional Antiblocking agents are suitable for use in the thermoplastic host polymer. Antiblocking agents are used primarily in films to modify the inherent self-adhesion that causes the film layers to stick together. Antiblocking agents may include inorganic particles such as silk, talc, and diatomite (processed diatomaceous earth) that may be added at the compounding step to form a roughness at the surface that prevents the flint layers from sticking. Specific antiblocking agents may include materials such as calcium carbonate, calcium stearate, zinc stearate, calcium lactate, magnesium lactate, potassium aluminum sulfate (alum), and the array of hydrotalcite compounds such as magnesium aluminum hydroxide carbonate hydrate or magnesium aluminum hydroxide monohydrogen-orthophosphate hydrate.

The fluorocarbon or fluorinated polymers useful in this invention are generally homopolymers and copolymers of fluorinated olefins having a fluorine atom-to-carbon atom ratio of at least 1:2, preferably at least 1:1. Homopolymers which can be used are those derived, for example, from vinylidene fluoride and vinyl fluoride. Copolymers of fluorinated olefins can be those derived, for example, from vinylidene fluoride, and one or more additional olefin comonomers, which can be fluorinated, e.g. hexafluoropropylene, tetrafluoroethylene, and fluorinated vinyl ethers or non-fluorinated, e.g. propylene.

Preferred fluorocarbon polymers are copolymers of vinylidene fluoride (VDF) with at least one terminally unsaturated fluoromonoolefin containing at least one fluorine atom on each double-bonded carbon atom, each carbon atom of said fluoromonoolefin being substituted only with fluorine, chlorine, bromine, hydrogen or lower fluoroalkyl (e.g. perfluoroalkyl having one to four carbon atoms) or fluoroalkoxy radical, (e.g. perfluoroalkoxy having one to four carbon atoms). Preferred comonomers with vinylidene fluoride are hexafluoropropylene, tetrafluoroethylene, chlorotrifluoroethylene, and pentafluoropropylene. Also useful are elastomeric copolymers of tetrafluoroethylene (TFE) with similar comonomers as well as non-fluorinated comonomers, such as propylene. Particularly preferred are the fluorinated polymers produced by copolymerizing hexafluoropropylene and vinylidene fluoride, as described in U.S. Pat. Nos. 3,051,677 (Rexford) and 3,318,854 (Honn, et al) and those polymers produced by copolymerizing hexafluoropropylene, vinylidene fluoride and tetrafluoroethylene as described in U.S. Pat. No. 2,968,649 (Pailthorp et al.). The elastomeric copolymers of hexafluoropropylene and vinylidene fluoride having between about 15 and about 50 mole percent hexafluoropropylene, optionally with the addition of up to 5 to 30 mole percent tetrafluoroethylene, are particularly useful. Also useful as fluorocarbon polymers are copolymers of VDF or TFE that are thermoplastic in nature i.e., melt processible. These polymers are semi-crystalline, have a melt point and include such copolymers as TFE/HFP/VDF (also known as THV), TFE/HFP/Ethylene (also known as HTE), TFE/Propylene, TFE/perfluoroalkyl vinyl ethers (also known as PFA), TFE/HFP (also known as FEP) and HFP/VDF (thermoplastic).

The dendritic materials according to the invention may comprise a core, at least one branching generation and an external surface composed of end groups. A branching generation is composed of structural units which are bound radially to the core or to the structural units of a previous generation and which extend outwards. Preferably, the number of branching generations is two or more. The structural units have at least two monofunctional groups and/or at least one monofunctional group and one multifunctional group. The term multifunctional is understood as having a functionality of 2 or higher. To each functionality, a new structural unit may be linked, a higher branching generation being produced as a result. The structural units may either be the same (they are repeated, therefore) for each successive generation, or they may be different. Dendritic materials can be characterized, inter alia, on the basis of a degree of branching. The term "degree of branching" of a dendritic material of a particular generation is understood as the ratio between the number of branchings present and the maximum possible number of branchings in a completely branched dendrimer of the same generation. The term "functional end groups" of a dendritic material refers to those reactive groups which form part of the external surface. The branchings may occur with greater or lesser regularity. While it is possible, in the dendritic materials which can be used within the scope of the invention, for the branchings at the external surface of the molecule all to be of the same generation, it is also possible for the branchings at the surface to be of different generations. The latter may be the case, for example, if the synthesis of the dendrimers proceeds in a less controlled manner.

The term dendritic material according to this invention is also understood to include dendrimers having defects in the branching structure, dendrimers having an incomplete degree of branching, asymmetrically branched dendrimers, star polymers, highly branched polymers, highly branched copolymers and/or block copolymers of highly branched and not highly branched polymers.

For the purpose of this invention, the term dendritic material does not include materials merely having multiple pendant functional groups without any branching in the backbone of the molecule. Such materials not within the scope include polyvinyl acetate, polyvinyl alcohol, ethylene diamine tetra acetic acid and copolymers such as ethylene/vinyl alcohol.

The dendritic materials useful in this invention include polyester type molecules as described in WO 96/12754 and polyester amide molecules as described in patent application NL 1008189.

The addition of the processing aid composition, i.e., the fluorocarbon polymer and dendritic material, to the thermoplastic polymer (host polymer) can be accomplished by any of the means conveniently employed to add materials, such as adjuvants, to polymers. Thus the fluorocarbon polymer and dendritic material can be added to the host polymer in a heated mixing device, such as a Banbury mixer, or a mixing extruder. Generally, at least the final mixing operation is carried out at a temperature above the melting point of the host polymer and polymeric additives to provide uniform distribution of the fluorocarbon polymer and dendritic material throughout the thermoplastic host polymer. The fluorocarbon polymer and the dendritic material can each be individually coated from solution onto the thermoplastic host polymer to create a masterbatch of coated host polymer which then may be dry blended with an appropriate quantity of the uncoated host polymer to achieve the desired concentration of fluorocarbon polymer and dendritic material in the extrudable composition.

The processing aid composition can be prepared by blending the components using any of the means conveniently employed to add adjuvants to polymers. Thus the fluorocarbon polymer, dendritic material and any other adjuvants to be added at the same time can be blended using conventional methods, such as a heated mixer, a mixing extruder or can be dry blended using a mixer. Generally, the mixing operation of the fluorocarbon polymer and dendritic material is carried out at a temperature above their melting point if thermoplastic, or above their glass transition temperature if amorphous to provide uniform distribution of components in the composition. A masterbatch may be created by adding the processing aid composition or its components to a small quantity of the hydrocarbon polymer or to a material compatible with the hydrocarbon polymer.

The amount of fluorocarbon polymer and dendritic material used in said extrudable compositions or said processing aid composition can vary and will be dependent upon such factors as the type of host polymer used, the type of fluorocarbon polymer used, the type of dendritic material used, and extrusion conditions. Stated functionally, the amount of fluorocarbon polymer and dendritic material used in the extrudable composition or processing aid composition will be that amount sufficient to reduce melt defects in a host polymer when the combination is extruded. Generally the weight of said fluorocarbon polymer present in said extrudable composition or in said processing aid composition and the weight of said dendritic material present in said extrudable composition or in said processing aid composition are in a ratio of from 10:1 to 1:10, and preferably in a ratio of from 1:2 to 1:6. The extrudable composition will contain at least 0.005 wt % fluorocarbon polymer and at least 0.0005 wt % dendritic material. Preferably, said extrudable compositions will contain 0.005 to 0.2 weight % fluorocarbon polymer and 0.0005 to 2 weight % dendritic material based on total composition weight. More preferably, said extrudable compositions will contain 0.02–0.08 weight % fluorocarbon polymer and 0.01–0.24 weight % dendritic material based on total composition weight. Generally, the fluorocarbon polymer and dendritic material will be the major or predominant components of said processing aid composition, and preferably said processing aid composition will contain 10 to 90 weight percent of dendritic material and 10 to 70 weight percent of fluorocarbon polymer, where said weight percent is based on total processing aid composition weight. When a masterbatch is prepared as a processing aid composition, the weight ratio of the dendritic material to the fluorocarbon polymer is as listed above based on the total weight of these two components without regard to the host polymer or carrier present in the composition.

This invention is useful in the processing of thermoplastic host polymers, which includes for example, extrusion of films, extrusion blow molding, injection molding, pipe, wire or cable extrusion, and fiber production.

The following examples are offered to aid in a better understanding of the present invention and are not to be unnecessarily construed as limiting the scope thereof.

EXAMPLES

Description of Materials Used in Examples

VDF=vinylidene fluoride
HFP=hexafluoropropylene
TFE=tetrafluoroethylene
P=propylene Melt Flow Index of fluoropolymers measured in accordance with ASTM D-1238 at a support weight of 5 Kg and a temperature of 265 C. (2.1 mm diameter extrusion die/8 mm length).

TABLE 1

Fluoropolymer Processing Additive (PPA).

| Sample Name | Polymer Description | Monomer Weight % | Tm (° C.) | Viscosity |
|---|---|---|---|---|
| PPA1 | Copolymer VDF/HFP | 60/40 | — | Mooney = 32 |
| PPA2 | Terpolymer VDF/HFP/TFE | 38/20/42 | 120 | MFI = 20 |
| PPA3 | Copolymer TFE/P | 85/15 | 100 | MFI = 14 |

TABLE 2

Dendritic Materials.

| Sample Name | Macromolecule Description | Functional Groups | Product Name | Source |
|---|---|---|---|---|
| D1 | Hyperbranched polyester | Hydroxyl | Boltorn H 50 | Perstorp AB |
| D2 | Hyperbranched polyesteramide | Hydroxyl and stearic esters | Hybrane PS2550 | DSM |
| D3 | Hyperbranched polyesteramide | Hydroxyls and methacrylic esters | Hybrane HM 1860 | DSM |
| D4 | Hyperbranched polyesteramide | Hydroxyl | Hybrane H1500 | DSM |

Perstorp AB is located in Perstorp, Sweden
Dutch State Mines (DSM) is located in Heerlen, The Netherlands

TABLE 3

Host Polymers.

| Sample Name | Polymer Type |
|---|---|
| R1 | Butene LLDPE (0.918 density, 1.0 melt index) |
| R2 | Octene LLDPE (0.920 density, 1.0 melt index) |
| R3 | MDPE (0.935 density, 0.8 melt index) |

LLPDB = linear low density polyethylene
MDPE = medium density polyethylene

Evaluations of the use of dendritic materials in combination with fluoropolymer process additives were accomplished using a capillary rheometer and by making blown film samples.

The equipment and procedures used for the capillary rheometer testing is described in U.S. Pat. No. 5,830,947 at col 23 In 53 through col 25 In 13. The samples were prepared as follows:

Capillary Rheometry Examples

Formulations for capillary rheometry testing were prepared using a Haake Rheocord™ System 40 torque rheometer and Rheomix™ 600 mixing bowl fitted with roller blades. Masterbatch concentrates containing 3 wt. % additives (PPA, dendritic materials) were compounded in host polymer R1 at 190 C. for 8 minutes. The masterbatches were then chopped and ground. Let-down (final concentration) batches were prepared by premixing the appropriate amount of ground masterbatch with R1, then repeating the compounding, chopping and grinding steps so that additives were well dispersed in the LLDPE resin. Additive concentrations in let-down batches were 1000 ppm. Combinations of dendritic materials and fluoropolymers always contained 1000 ppm total additives at a ratio of 2 parts dendritic materials (667 PPM) to 1 part fluoropolymer (333 PPM).

Let-down batches were tested on an Instron 4204 capillary rheometer using a method previously described. The samples were extruded at 210 C. and extrudate was examined for evidence of melt fracture. Samples were collected at shear rates of 100, 200, 400, 600, 800, 1000, 1200, 1600 and 2000 $s^{-1}$.

Examples 1–3

In Examples 1–3, extrudable compositions of host polymer R1 were made and evaluated as described above that included 667 parts per million (ppm) of dendritic material D2 each and 333 ppm of fluoropolymer additive PPA1, PPA2 and PPA3 respectively.

Comparative Example C1

In Comparative Example C1, an extrudable composition was made and evaluated in a manner similar to Example 1 except the dendritic material D2 was added at 1000 ppm and no fluoropolymer additive was used.

Examples 4–6

In Examples 4–6, extrudable compositions were made and evaluated in a manner similar to Examples 1–3 respectively except the dendritic material D3 was used instead of D2.

Comparative Example C2

In Comparative Example C2, an extrudable composition was made and evaluated in a manner similar to C1 except 1000 ppm of dendritic material D3 was used instead of D2.

Examples 7–9

In Examples 7–9, extrudable compositions were made and evaluated in a manner similar to Examples 1–3 respectively except the dendritic material D4 was used instead of D2.

Comparative Example C3

In Comparative Example C3, an extrudable composition was made and evaluated in a manner similar to C1 except 1000 ppm of dendritic material D4 was used instead of D2.

Comparative Examples C4–C7

In Comparative Examples C4–C7, extrudable compositions were made and evaluated in a manner similar to Example 1 except C4 contained no PPA and no dendritic material and C5–C7 contained 1000 ppm of fluoropolymer additive PPA1, PPA2 and PPA3 respectively.

The delay in melt fracture onset is shown in Table 4. The Table shows the highest (or last) shear rate attainable during the capillary rheometer test where the extrudate was still free of melt fracture.

Each value represents a mixture containing the dendritic material of the specific column and the PA of the specific row intersecting at the cell containing the value. For example, the result for Example 9 (the mixture of D4 and PPA3) is 1000.

TABLE 4

Last Shear Rate ($s^{-1}$) with Smooth Extrudate.

| Dendrimer Fluoropolymer | D2 | D3 | D4 | None |
|---|---|---|---|---|
| PPA1 | 1200 | 1200 | 1200 | 1200 |
| PPA2 | 1200 | 1200 | 1200 | 1200 |
| PPA3 | 400 | 1200 | 1000 | 1200 |
| None | 400 | 200 | 200 | 400 |

The results in Table 4 indicate the ability of the polymer processing aid composition to delay the onset of melt fracture. The examples of PPA1 and PPA2 in synergistic combination with each of the dendritic materials evaluated were as successful in delaying melt fracture onset as the comparative examples with a full loading of fluoropolymer processing aid. The examples containing PPA3 were nearly as successful in combination with D4 and equal with D3. The dendritic materials alone were at best equal to no additives and actually had a negative effect in two cases.

Pressure change (in percent) at the capillary die was monitored with respect to the initial pressure occurring with the LLDPE (host polymer R1) without any additives. These results are listed in Table 5.

TABLE 5

Pressure Reduction (%) at 600 $s^{-1}$.

| Dendrimer Fluoropolymer | D2 | D3 | D4 | None |
|---|---|---|---|---|
| PPA1 | 49 | 44 | 40 | 39 |
| PPA2 | 41 | 44 | 53 | 43 |
| PPA3 | 38 | 39 | 42 | 19 |
| None | 15 | 3 | 19 | 0 |

The results in Table 5 show the ability of the polymer processing aid composition to reduce the pressure at the die during processing. This includes a significant reduction when compared to no additive of either type, and an improvement over the pressure drop when compared to the dendritic material additive alone at the 1000 ppm level. The pressure reduction using the processing aid composition of the invention is equal to or better than the comparative examples using fluoropolymer alone at 1000 ppm. As the processing aid composition examples of the invention contain only 333 ppm fluoropolymer plus the dendritic material, the effectiveness of the fluoropolymer component is much improved. The largest improvement in pressure reduction is seen in the combination of PPA3 with any of the dendritic materials when compared to the fluoropolymer alone.

FIG. 1 shows the greater pressure reduction enjoyed by the extrudable composition of the invention (Example 7) when compared to an additive comprising only dendritic material (Comparative Example C3). The results for the Comparative Example C5 were similar to those for Example 7, but utilized three times the concentration of fluoropolymer to reach that result.

Blown Film Examples

Additive masterbatch concentrates were prepared in a Haake 19 mm co-rotating twin screw extruder with fully intermeshing screws at 180 C. extrusion temperature. A 2 MI LLDPE resin was used as the carrier resin. The extruder and die were purged thoroughly with a 70% calcium carbonate purge compound prior to introducing additives to the extruder. Masterbatches containing additives were tumble blended with an appropriate amount of polyethylene to give the desired level of additive. These masterbatches of the 2MI resin with 5 wt % dendritic material D4, 5 wt % PPA1 and 5 wt % of a 2:1 mixture of D4 and PPA1 respectively.

Additive performance was assessed based on % melt fracture measured in film samples at regular intervals. A control condition of fully melt fractured film and stable extrusion pressure was established prior to introducing additives to the extruder.

Example 10

In Example 10, a blown film sample was made in a manner similar to that described in U.S. Pat. No. 6,277,919, Examples 1–10 except the host polymer was the same as the masterbatch carrier resin described above, the masterbatch concentrate contained the 2:1 mixture of D4 and PPA 1 and a commercial antiblock of diatomaceous earth (25 wt % masterbatch, available from Ampacet corp., located in Tarrytown, N.Y.). The experiments were conducted at 204 C., at a shear rate of 270 $s^{-1}$ and with 5000 PPM antiblock. The additive level was started at 300 PPM, then increased every hour until melt fracture cleared. The results are shown in FIG. 2.

Comparative Examples C8–C9

In Comparative Example C8, a blown film sample was made and evaluated in a manner similar to Example 10 except the additive masterbatch contained PPA1 instead of the D4/PPA1 mixture.

In Comparative Example C9, a blown film sample was made and evaluated in a manner similar to Example 10 except the additive masterbatch contained D4 instead of the D4/PPA1 mixture.

Even though severe melt fracture was cleared at a high level with D4 (Comparative Example C9, FIG. 2), isolated regions of melt fracture, hereinafter referred to as melt fracture pox, remained in the sample even at the highest level of D4. The melt fracture pox was completely eliminated only when fluoropolymer was present (Example 10 and Comparative Example C8).

The data shown in FIG. 2 indicates that the dendritic material D4 in combination with PPA1 (Example 10) gives better performance than either additive alone in the presence of antiblock, even when the individual additives are present at higher levels than the combination. With the D4/PPA 1 combination (Example 10), melt fracture cleared at 500 PPM of the mixture compared to 600 PPM of fluoropolymer alone.

Example 11

In Example 11, a film sample was made in a manner similar to Example 10 except the host resin was R2 LLDPE extruded at a flat temperature profile of 199 C. and a shear rate of 600 $s^{-1}$. A commercial antiblock masterbatch containing 60 wt. % ABT-2500 (available from Ampacet Corp.) was added at 5000 ppm. ABT-2500 is an antiblock that has been found to dramatically interfere with fluoropolymer PPA performance. The additives (antiblock and processing aid composition) were incorporated in the film by tumble blending masterbatches with base resin prior to introduction to the extruder. The formulation contained 5000 ppm antiblock and 900 ppm of the 2:1 mixture of D1/PPA1. The percentage of melt fracture in the film was determined visually at 10 minute intervals from first addition. These results are shown in Table 5.

Comparative Examples C10–C12

In Comparative Example C10–C12, film samples were made and evaluated in a manner similar to Example 11 except for C10, the processing aid composition contained only PPA1 and was added at 300 ppm for C11, only PPA1 added at 900 ppm and for C12, only D1 added at 1000 ppm.

Comparative Example C13

In Comparative Example C13, a film sample was made and evaluated in a manner similar to Example 11 except the additive used was a mixture of 300 ppm of PPA1 and 600 ppm of a 13% EVA polyethylene copolymer (Hoechst Wax 890, available from Clariant Corp., Charlotte, N.C.).

TABLE 5

% Melt Fracture in Film as a Function of Extrusion Time.

| Extrusion time (minutes) | 300 ppm PPA1 Comp. Ex. C10 | 900 ppm PPA1 Comp. Ex. C11 | 300 ppm PPA1 600 ppm D1 Example 11 | 1000 ppm D1 Comp. Ex. C12 | Comp Ex. 13 |
|---|---|---|---|---|---|
| 0 | 100% | 100% | 100% | 100% | 100% |
| 10 | 99 | 97 | 98 | 100 | 100 |
| 20 | 98 | 30 | 75 | 100 | 98 |
| 30 | 75 | 8 | 20 | 100 | 98 |
| 40 | 50 | 4 | 4 | 95 | 75 |
| 50 | 50 | 1 | 2 | 90 | 45 |
| 60 | 45 | 1 | 1 | 60 | 45 |
| 70 | 40 | 1 | 1 | 50 | 35 |
| 80 | 25 | 1 | 0 | 50 | 30 |
| 90 | 25 | 1 | | 50 | 25 |
| 100 | 25 | 0 | | 40 | 25 |
| 110 | 20 | | | 40 | 20 |
| 120 | 20 | | | 40 | 20 |

The results shown in Table 5 demonstrate the advantage of the processing aid composition used in Example 11 in the presence of antiblock in both the short time to eliminate melt fracture and the efficiency in the amount of fluoropolymer necessary when compared to the film samples only with fluoropolymer, only with dendritic material or with an additive mixture that does not include a dendritic material.

During the extrusion of Examples 11 and C10–C11, percent pressure reduction at the extruder gate was recorded at 10 minute intervals. The results are shown in Table 6.

TABLE 6

Gate Pressure Reduction (%) Observed with Additives.

| Extrusion time (minutes) | PPA1 300 ppm Comp. Ex. C10 | PPA1 900 ppm Comp. Ex. C11 | 300 ppm PPA1 600 ppm D1 Example 11 |
|---|---|---|---|
| 0 | 0 | 0 | 0 |
| 10 | 1 | 1 | 2 |
| 20 | 2 | 5 | 4 |
| 30 | 6 | 10 | 6 |
| 40 | 7 | 11 | 8 |
| 50 | 8 | 12 | 9 |
| 60 | 9 | 12 | 9 |
| 70 | 9 | 12 | 10 |
| 80 | 10 | 12 | 11 |
| 90 | 10 | 12 | |
| 100 | 10 | 12 | |
| 110 | 10 | | |
| 120 | 10 | | |

The results in Table 6 show the compositions of the invention perform at least as well as the fluoropolymer additive alone.

Example 12

In Example 12, a film sample was made and evaluated in a manner similar to Example 11 except the resin composition was extruded with a melt temperature of 224° C., a die temperature of 232° C. and a shear rate of 600 sec$^{-1}$. No antiblock additive was used. The processing aid composition included a 2:1 mixture of D2 and PPA1 added at a total of 600 ppm. A visual examination of the film was made at periodic intervals to evaluate melt fracture elimination.

Examples 13–17 and Comparative Examples C14–C18

In Example 13–17 and Comparative Examples C14–C18, film samples were made in a manner similar to Example 12 except the processing aid compositions included the additives as shown in Tables 7 and 8. The mixtures of Examples 13–17 were 2:1 mixtures of dendritic materials to fluoropolymer and were added at a total of 600 ppm. The addition rate for the individual additives in C14–C18 were also 600 ppm.

TABLE 7

| Example | 2:1 Mixture |
| --- | --- |
| 12 | D2/PPA1 |
| 13 | D3/PPA1 |
| 14 | D4/PPA1 |
| 15 | D2/PPA2 |
| 16 | D3/PPA2 |
| 17 | D4/PPA2 |

TABLE 8

| Comparative Example | Component |
| --- | --- |
| C14 | D2 |
| C15 | D3 |
| C16 | D4 |
| C17 | PPA1 |
| C18 | PPA2 |

Examples 12 and 14–17 demonstrated a dramatic reduction in the melt fracture in the film when compared to C14–C16. Examples 12, 14 and 17 showed nearly as much melt fracture reduction as C17 and C18.

What is claimed is:

1. An extrudable composition comprising a) a major amount of a melt-processable thermoplastic host polymer, b) a minor amount of a processing aid composition including a fluorocarbon polymer, and a dendritic material.

2. An extrudable composition according to claim 1 wherein the ratio of the fluorocarbon polymer to the dendritic material is less than or equal to 10:1.

3. An extrudable composition according to claim 2 wherein the ratio of the fluorocarbon polymer to the dendritic material is from 10:1 to 1:10.

4. An extrudable composition according to claim 1 further comprising an antiblocking agent.

5. An extrudable composition according to claim 1 wherein the amount of the fluoropolymer is at least 0.005 wt % of the total composition and the amount of the dendritic material is at least 0.0005 wt % of the total composition.

6. A method comprising extruding the composition of claim 1.

7. A method according to claim 6 wherein upon extrusion a resulting extrudate displays no melt defects.

\* \* \* \* \*